(12) United States Patent
Chapman

(10) Patent No.: US 7,979,328 B1
(45) Date of Patent: Jul. 12, 2011

(54) METHOD AND SYSTEM FOR INTERACTIVE INVOICE INQUIRY

(75) Inventor: Darel Chapman, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1828 days.

(21) Appl. No.: 10/269,459

(22) Filed: Oct. 11, 2002

(51) Int. Cl.
*H04M 15/00* (2006.01)
*G06Q 40/00* (2006.01)

(52) U.S. Cl. ............... 705/34; 705/39; 705/40

(58) Field of Classification Search .............. 705/34, 705/40

See application file for complete search history.

(56) References Cited

U.S. PATENT DOCUMENTS

| | | | | |
|---|---|---|---|---|
| 5,884,288 A * | 3/1999 | Chang et al. | ............... | 705/40 |
| 6,360,211 B1 * | 3/2002 | Anderson et al. | ............... | 705/40 |
| 2001/0047332 A1 * | 11/2001 | Gonen-Friedman et al. | ... | 705/40 |
| 2002/0010664 A1 * | 1/2002 | Rabideau et al. | ............... | 705/30 |
| 2002/0178117 A1 * | 11/2002 | Maguire et al. | ............... | 705/40 |
| 2002/0184121 A1 * | 12/2002 | Sijacic et al. | ............... | 705/30 |
| 2002/0184123 A1 * | 12/2002 | Sijacic et al. | ............... | 705/34 |
| 2002/0194127 A1 * | 12/2002 | Randell et al. | ............... | 705/40 |
| 2002/0198830 A1 * | 12/2002 | Randell et al. | ............... | 705/40 |
| 2003/0069845 A1 * | 4/2003 | DeWitt et al. | ............... | 705/40 |
| 2003/0093373 A1 * | 5/2003 | Smirnoff et al. | ............... | 705/40 |
| 2003/0105759 A1 * | 6/2003 | Bess et al. | ............... | 707/9 |
| 2003/0220843 A1 * | 11/2003 | Lam et al. | ............... | 705/26 |

OTHER PUBLICATIONS

Business Editors/Computer Writers. (May 18). Just in Time Solutions Introduces BillCast Family of Products for Open Internet Billing. Business Wire,1. Retrieved Feb. 25, 2011, from Business Dateline. (Document ID: 29517941).*

* cited by examiner

*Primary Examiner* — Matthew S Gart
*Assistant Examiner* — Scott A Zare
(74) *Attorney, Agent, or Firm* — Stolowitz Ford Cowger LLP

(57) ABSTRACT

A method and system for interactive invoice inquiry. In one method embodiment, the present invention receives an invoice. The present invention then stores the invoice in a network-accessible database. Next, the present invention authorizes a requester access to the invoice stored in the network-accessible database. The present invention further authorizes a supplier access to the invoice stored in the network-accessible database. In so doing, the present invention simplifies the resolution of a payment issue for the invoice stored in the network-accessible database.

19 Claims, 6 Drawing Sheets

400

Table 305

Standard Hold Report 405

| Invoice Number 410 | Invoice Date 415 | Currency 420 | Original Amount 425 | Remaining Amount 430 | Hold Code 435 | Hold Reason 440 | PO Number 445 | PO line Number 450 | PO Shippment Number 455 | Requestor 460 |
|---|---|---|---|---|---|---|---|---|---|---|
| 33256 | 1/15/02 | USD | 450.00 | 450.00 | N/A | N/A | None | None | 65432 | J. Doe |
| 33257 | 1/16/02 | USD | 5,564.00 | 450.00 | 17 | Not Received | 65872 | 65872 | 65872 | Y.S.Y |
| 42561 | 1/16/02 | USD | 1,000.00 | 1,000.00 | 11 | Over Charge | 32158 | 98752 | 98562 | Q. M.Y |
| | | | | | | | | | | |
| | | | | | | | | | | |
| n | n | n | n | n | n | n | n | n | n | n |

| Standard Hold Report 405 | | | | | | | | | | | |
|---|---|---|---|---|---|---|---|---|---|---|---|
| Invoice Number 410 | Invoice Date 415 | Currency 420 | Original Amount 425 | Remaining Amount 430 | Hold Code 435 | Hold Reason 440 | PO Number 445 | PO line Number 450 | PO Shippment Number 455 | Requestor 460 |
| 33256 | 1/15/02 | USD | 450.00 | 450.00 | N/A | N/A | None | None | 65432 | J. Doe |
| 33257 | 1/16/02 | USD | 5,564.00 | 450.00 | 17 | Not Received | 65872 | 65872 | 65872 | Y.S.Y |
| 42561 | 1/16/02 | USD | 1,000.00 | 1,000.00 | 11 | Over Charge | 32158 | 98752 | 98562 | Q.M.Y |
| " | " | " | " | " | " | " | " | " | " | " |

Table 305

METHOD AND SYSTEM FOR INTERACTIVE INVOICE INQUIRY

FIELD OF THE INVENTION

The present claimed invention relates to the field of invoice inquiry. Specifically, the present claimed invention relates to a method and system for interactive invoice inquiry over a network.

BACKGROUND ART

Generally, in a corporate environment, goods purchasing may be broken down into three parts. First, a requestor (within the company) may require a piece of equipment that is not on hand in order to continue work. Next, the requestor will request the piece of equipment from a central purchasing (processing) group. Finally, the central processing group will make the purchase from a specific supplier and the desired piece of equipment will be delivered. In most cases, the supplier will be paid via terms outlined in a purchase contract; normally, after the equipment has arrived.

However, in some situations, a hold may be placed against the payment to a supplier due to payment issues which arise from the terms of a purchase contract. For example, a suppliers' payment may be placed on hold if an incorrect invoice number was used on the bill or if the invoice was filed under the wrong purchase order (PO) (either by supplier, requestor, or the central processing group).

Normally, the resolution of a hold payment usually requires some type of dispute resolution. A typical dispute resolution is outlined in FIG. 1. Specifically, system 100 illustrates the three main players and the actions taken in resolving a payment dispute. In many cases, a supplier 130 will call a central processing facility 110 in order to establish the status of a specific payment, or set of payments which have not been received. Central processing 110 may then contact a requestor 120 to find out the status of the delivered goods for which supplier 130 is requesting payment thereof. Requestor 120 will then answer the question posed by central processing 110 thereby allowing central processing 110 to resolve the payment hold and pay supplier 130.

However, one problem with the current payment resolution environment is the sheer size of both requestor 120 and supplier 130 in comparison with central processing 110. For example, it is not uncommon in an average size company for requestor 120 and supplier 130 to submit tens of thousands of invoices on a per anum basis. Furthermore, it is not uncommon for central processing 110 to include only 15 individuals ranging in skills from clerk, to corporate purchaser, to corporate buyer, to manufacturing buyer. Therefore, it is easy to recognize that the choke point in the entire payment dispute system 100 is central processing 110. Specifically, even with the best central processing 110 workers working around the clock, the deficit in personnel-per-conflict may be insurmountable.

In many cases, due to the size of the choke-point or the type of payment hold, the resolution may not be so simple nor may it be as swift as described herein. For example, if the payment hold is a complex issue (e.g., PO overcharged, etc.) a simple phone call from central processing 110 to requestor 120 may not resolve the issue. In fact, there may be a need for follow-up calls, e-mails, and/or paperwork between requestor 120, central processing 110 and supplier 130 in order to completely resolve the payment hold and allow supplier 130 to receive payment.

Therefore, one method that is used for increasing the efficiency with which payment holds are resolved is to allow requestor 120 (but not supplier 130 due to company security reasons) to receive the disputed invoice (or group of invoices if it is a PO issue) for analysis. Thus, requestor 120 may try to resolve the issue for supplier 130 by sorting through the data to find the clerical error.

One deleterious effect of this method of payment resolution is that requestor 120 may not be trained in the clerical arts utilized by central processing 110 or supplier 130. Therefore, requestor 120 may spend an exorbitant amount of time trying to understand a single issue while never being privy to the big picture. Furthermore, requestor 120 may have a schedule which does not allow for the amount of time required to study an invoice, proof it for errors, check for possible PO issues between invoices, and the like. Thus, the frustration for supplier 130 will grow, the inconvenience for requestor 120 will grow, and the bogging down of central processing 110 will also grow.

Furthermore, due to the possible complexity of the payment hold issue, supplier 130 may become so frustrated with the slowness of the payment resolution that it may limit interactions with the company or ally itself with a competitor. In many cases, when the situation becomes this desperate, a company may authorize central processing 110 to pay supplier 130 a lump sum to cover outstanding payments. This resolution may be even more deleterious if the company pays a lump sum to cover a specific portion of outstanding debt and the supplier credits the payment to a different portion of outstanding debt, thereby resulting in more argument and further confusion.

SUMMARY OF INVENTION

The present invention provides, in various embodiments, a method and system for interactive invoice inquiry. In one method embodiment, the present invention receives an invoice. The present invention then stores the invoice in a network-accessible database. Next, the present invention authorizes a requester access to the invoice stored in the network-accessible database. The present invention further authorizes a supplier access to the invoice stored in the network-accessible database. In so doing, the present invention simplifies the resolution of a payment issue for the invoice stored in the network-accessible database.

BRIEF DESCRIPTION OF THE DRAWINGS

The accompanying drawings, which are incorporated in and form a part of this specification, illustrate embodiments of the invention and, together with the description, serve to explain the principles of the invention:

PRIOR ART

FIG. 4 is a block diagram of an exemplary invoice inquiry table in accordance with one embodiment of the present invention.

DESCRIPTION OF THE PREFERRED EMBODIMENTS

In the following detailed description of the present invention, a method and system for interactive invoice inquiry, specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those that require physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "initiating", "transmitting", "storing", "authorizing", "utilizing", "resolving", "processing" or the like, refer to the action and processes of a computer system (e.g., FIG. 6), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
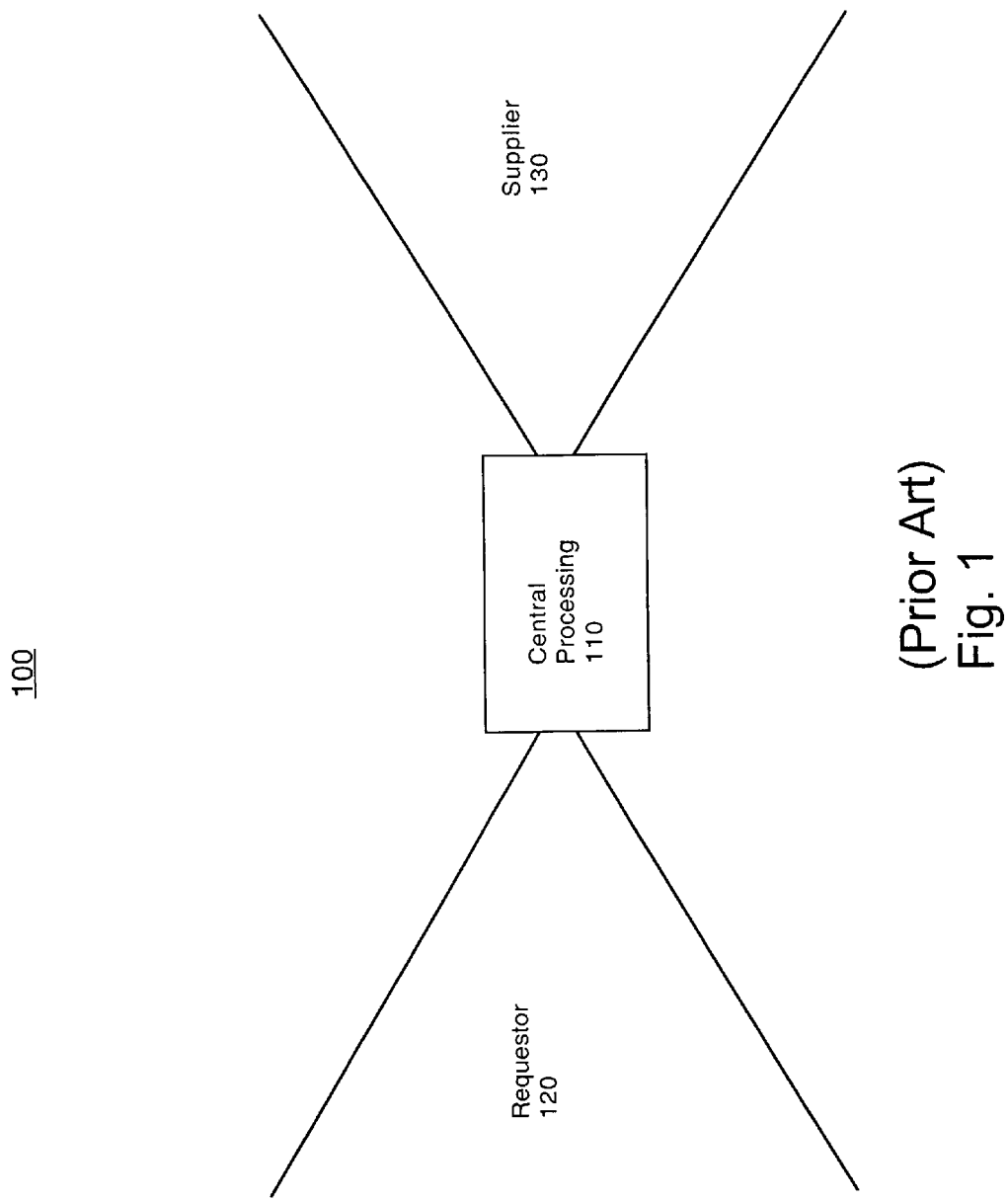
FIG. 1 is a diagram of the standard format for interactive invoice inquiry.
Figure 2:
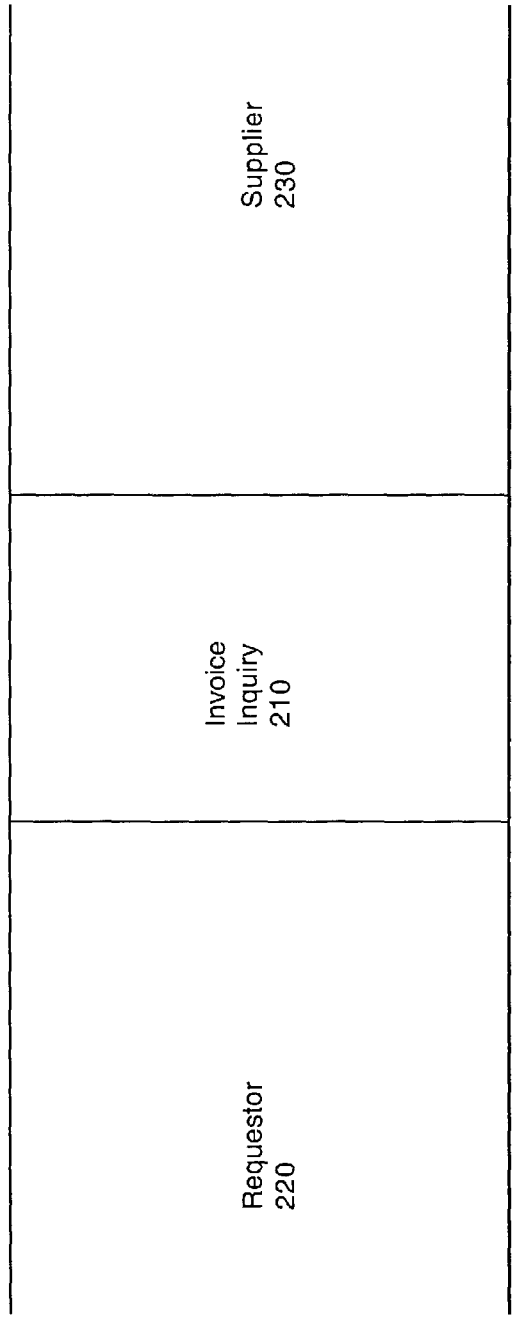
FIG. 2 is a block diagram of an exemplary system for interactive invoice inquiry in accordance with one embodiment of the present invention.

With reference now to FIG. 2, a block diagram of an exemplary system for interactive invoice inquiry 200 is shown in accordance with one embodiment of the present invention. In one embodiment, the present invention described herein is utilized for interactive invoice inquiry system 210 over a network without requiring a central processing branch as a mediator. Instead, both a supplier 230 of a product and a recipient (e.g., requestor 220) of the product may view the status of an invoice (e.g., on hold, over-billed, double billed, wrong authorization code, incorrect invoice number, incorrect purchase order (PO) number, or the like) over a network. Thus, billing disputes may be resolved by the supplier 230 and/or the requestor 220 without the need to involve the mediation of a central processing department.

Furthermore, due to the interactive nature of invoice inquiry system 200, a supplier 230 may learn (from previous invoice holds) a more efficient manner (e.g., where errors are occurring, correct billing process per company, or the like) of submitting an invoice for payment thereby reducing future payment holds. In one embodiment, invoice inquiry system 210 may be found in a tabular format based on a zero-training paradigm. That is, the invoice information may be organized in an easily navigable on-line format thereby allowing a user to simply log-on, choose the desired table (described in more detail herein), and begin an invoice inquiry system 210.

Figure 3:
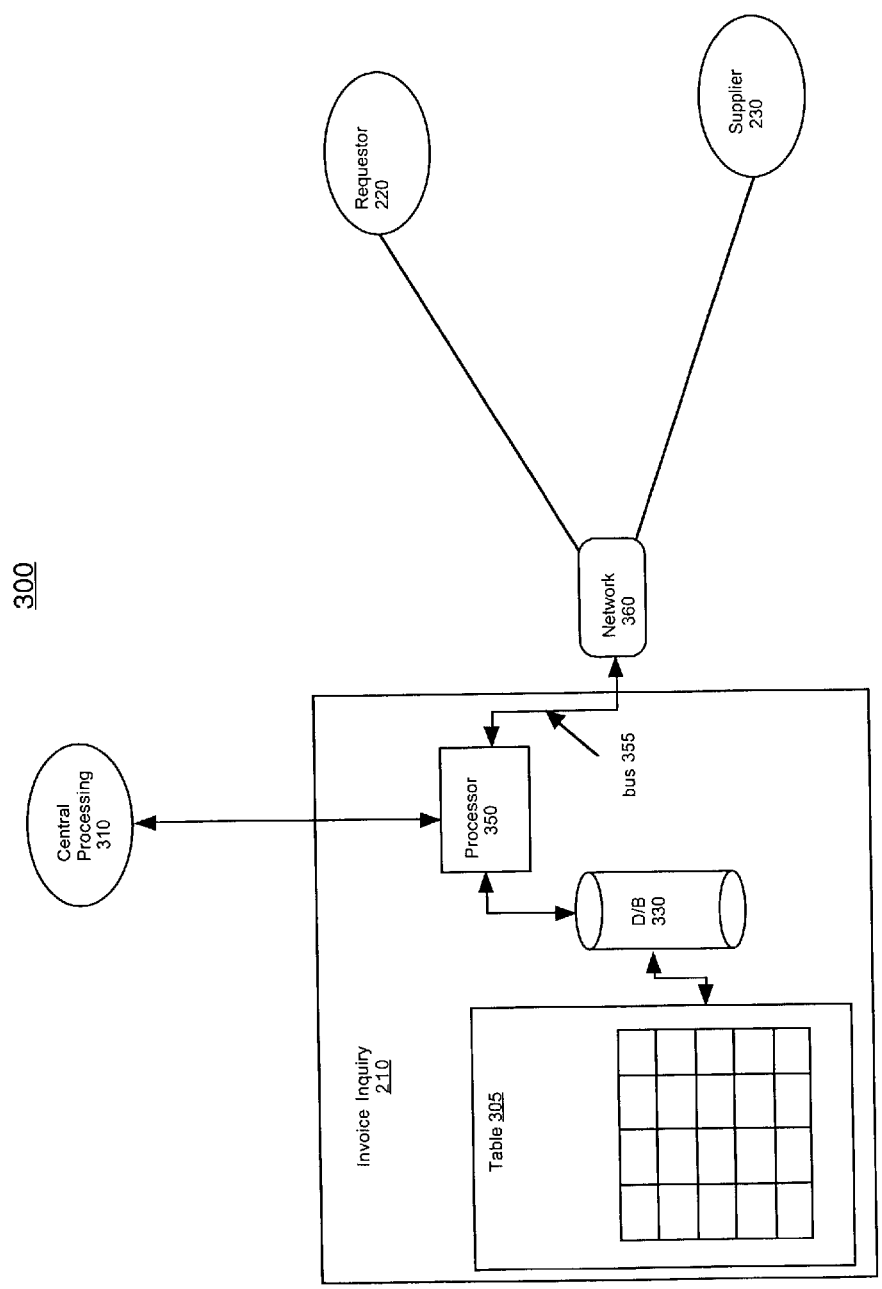
FIG. 3 is a block diagram of a system for interactive invoice inquiry in accordance with one embodiment of the present invention.

With reference now to FIG. 3, a block diagram of a system 300 for interactive invoice inquiry is shown in accordance with one embodiment of the present invention. In general, system 300, may use a network 360 (such as the Internet) to enable suppliers 230, internal requestors 220, and core procurement and payment processing groups (e.g., central processing 310) a means to collaborate on unresolved payment issues. Invoice inquiry system 210 provides all parties the same view to a visual, network-accessible database where users are able to quickly understand and resolve the issues. For example, by enabling cross talk between requester/approver community 220 and its supplier community 230. These parties frequently have knowledge, about the underlying transaction details, that are unavailable or incomprehensible to centralized processing group 310. This problem is common to processing groups at many companies and invoice inquiry system 210 provides a means to quickly and easily bring these "knowledge holders" into the resolution process.

In one embodiment, invoice inquiry system 210 includes processor 350, database 330, table 305, and bus 355. Outside of invoice inquiry system 210 are supplier 230, requestor 220, central processing 310, and network 360. All are discussed in more detail herein. Although invoice inquiry system 210 is depicted as a single device, embodiments of the present invention are well suited for use on a multiplicity of devices and/or databases having a number of distinct components, such as, for example, a network or chassis.

In one embodiment, invoice inquiry system 210 may be used by a supplier 230 or a requestor 220 to view an invoice or information relating to an invoice. For example, a supplier 230 may make an invoice inquiry system 210 into the status (e.g., paid, on hold, error on invoice, or the like) of a particular bill. Once the status is obtained, supplier 230 may contact the specific requestor 220 (or vice-versa) and discuss information about resolving the non-payment. For example, if a particular invoice is on hold due to being placed into the wrong PO, once the error is recognized (either by requestor 220 and/or supplier 230) the invoice may be assigned the correct PO thereby resolving the payment hold issue.

With reference still to FIG. 3, in one embodiment, database 330 may contain a plurality of interactive tables such as table 305. Furthermore, database 330 may be stored on a cache, a hard drive, a flash memory, or the like. In one embodiment, table 305 may be an invoice inquiry (e.g., a standard hold report described in detail in FIG. 4). In other embodiment, table 305 may be a PO inquiry table (e.g., for matching an invoices with the correct PO, or an open PO, a need to increase the PO, or the like). In yet another embodiment, table 305 may be a defective billing table (e.g., two invoices for the same product, over-charge on a product price, or the like). In another embodiment, table 305 may be a supplier profile (e.g., contact information for a specific product, contact info for a specific supplier, going rate for a product, or the like).

Referring still to FIG. 3, in various embodiments, network 360 may be a local area network (LAN), wide area network (WAN), telecommunications network, Ethernet, wireless network, Internet, or the like, which can support the connection of a single device or a plurality of devices. In addition, requestor 220 and supplier 230 may access network 360 via a computer, a telephone, a mobile phone, a pager, a personal digital assistant (PDA), or the like. Thus, the access of invoice inquiry may be made from any location which supports access to network 360 thereby allowing 24-hour 7-day-a-week access to invoice inquiry system 210.

As shown in system 300, in one embodiment central processing 310 has been removed as the choke point for the operation of invoice inquiry system 210. Instead, network 360 authorizes both supplier 230 and requestor 220 access to invoice information stored on database 330. In one embodiment, requestor 220 may have access to any invoice on database 330. Therefore, if requestor 220 wants to order a particular product but does not know from whom to order it or what price to expect, the answers may easily be resolved by accessing the invoice inquiry system 210 and looking at a similar product (or the same product) and its supplier (and/or price).

In one embodiment, supplier 230 may have limited access to invoice inquiry system 210. For example, supplier 230 may only be able to access the invoices submitted by supplier 230. Therefore, supplier 230 may have enough access to resolve their own invoice issues (e.g., payment holds, etc.) without having arbitrary access to discreet portions of the companies overall operation (e.g., the competitor, other prices paid for similar products, overall budget of the company, or the like).

With reference still to FIG. 3, due to the open nature of invoice inquiry system 210, payment inquiries which may have required an intermediary central processing group 310 may now be resolved without the intermediary. For example, input from requestor 220, supplier 230, or both may be utilized to resolve any issues (payment or otherwise) with respect to an invoice or a group of invoices in the network-accessible database. Thus, in one embodiment, once a resolution is reached, central processing 310 becomes a clerical position of ensuring the resolution is acted upon. In addition, since central processing 310s arbitration workload is largely reduced, central processing 310 may focus on becoming an auditing position.

With reference now to FIG. 4, a block diagram of an exemplary table 305 is shown in accordance with one embodiment of the present invention. Specifically, FIG. 4 is a detailed version of one of many possible embodiments for table 305. In table 305 of FIG. 4, a standard hold report 405 is broken down into eleven categories. Standard hold report 405 includes invoice number 410, invoice date 415, currency 420, original amount 420, hold code 435, hold reason 440, PO number 445, PO line number 450, PO shipping number 455, and requestor 460. Although a specific version of table 305 is shown in FIG. 4, it is appreciated that there are pluralities of categories that may be added or removed from table 305. The categories described herein are merely for purposes of brevity and clarity.

With reference still to table 305 of FIG. 4, in one embodiment when an invoice inquiry is received, table 305 is accessed and a specific format for viewing the selected invoice data is chosen. For example, standard hold report 405 may be chosen if the invoice inquiry is based on an invoice which has not been paid and either the supplier, or the requestor, or both want the status thereof.

In one embodiment, once the format of table 305 is selected (e.g., standard hold report 405), table 305 shows a formatted version (e.g., list) of the companies invoices (if requested by a supplier; or department invoices or overall invoices if selected by a requestor) and information regarding the status thereof. For example, the list may be organized by invoice number 410, or invoice date 415 (or any other category utilized therewith). Once standard hold report 405 is opened, the user can ensure that the invoice number 410 is correct, and that the invoice date 415 is correct.

Furthermore, a comparison can be made between the original amount 425 of the invoice and the amount remaining 430 to be paid. In addition, the hold code 435 may be listed in conjunction with the hold reason 440. Therefore, the user may be able to ascertain exactly why the invoice has not been paid and what can be done to correct the situation. Also listed on standard hold report 405 may be the PO number 445, the PO line number 450, and the PO shipment number 455. Therefore, the user can ensure that the product was billed to the right department, delivered to the right department, and resolve any inaccuracies residing therein.

The last column in a standard hold report 405 may be requestor 220. Requestor 220 column may include the name, phone number, e-mail address, or the like of the person who placed or authorized the request. This column allows a user to make contact with the requestor 220 if further discussion or action is required.

Figure 5:
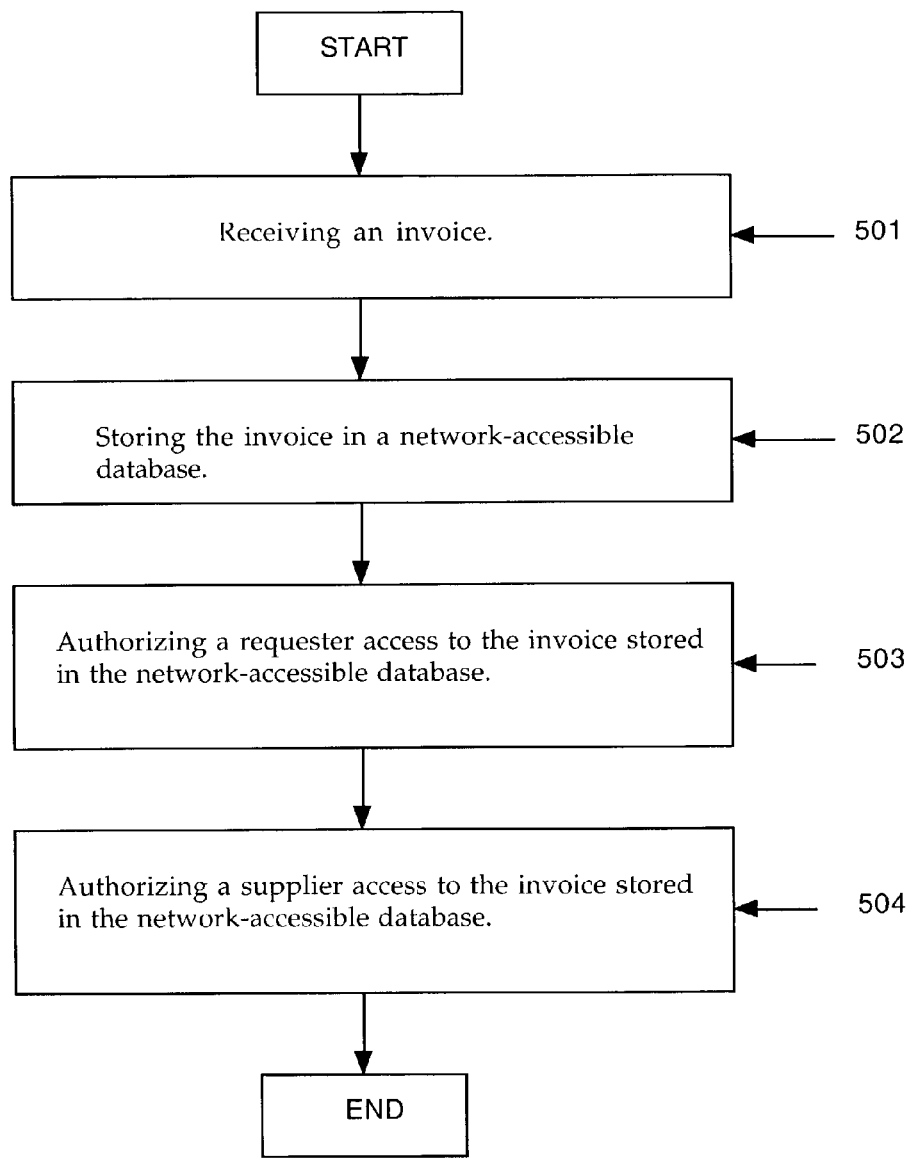
FIG. 5 is a flowchart of steps in an exemplary method for interactive invoice inquiry in accordance with one embodiment of the present invention.

With reference now to FIG. 5, flowchart 500 is an illustration of the exemplary steps used by an embodiment of the present invention. FIG. 5 includes process 500 of the present invention which, in one embodiment, is carried out by a processor under the control of computer-readable and computer-executable instructions. The computer-readable and computer-executable instructions reside, for example, in data storage features such as computer usable volatile memory 604, computer usable non-volatile memory 606, and/or data storage device 330 of FIG. 6. The computer-readable and computer-executable instructions are used to control or operate in conjunction with, for example, central processing unit 350 of FIG. 6.

Referring now to step 501 of FIG. 5 and FIG. 3, in one embodiment an invoice is received. As stated herein, the invoice may be received by invoice inquiry system 210. The reception of the invoice may be from central processing 310.

With reference now to step 502 of FIG. 5 and FIG. 3, in one embodiment an invoice is stored in a network-accessible database 300. As described in more detail herein, the invoice may be stored in database 330 and accessed as a portion of a table 305.

Referring now to step 503 of FIG. 5 and FIG. 3, in one embodiment a requestor 220 may be authorized access to the invoice stored in network-accessible database 300. As stated herein, requestor 220 may be internal to the company and therefore may receive unfettered access.

With reference now to step 504 of FIG. 5 and FIG. 3, in one embodiment a supplier 230 may be authorized access to the invoice stored in network-accessible database 300. As described in more detail herein, supplier 230 may be a company or person external to the company and therefore may receive limited access.

Figure 6:
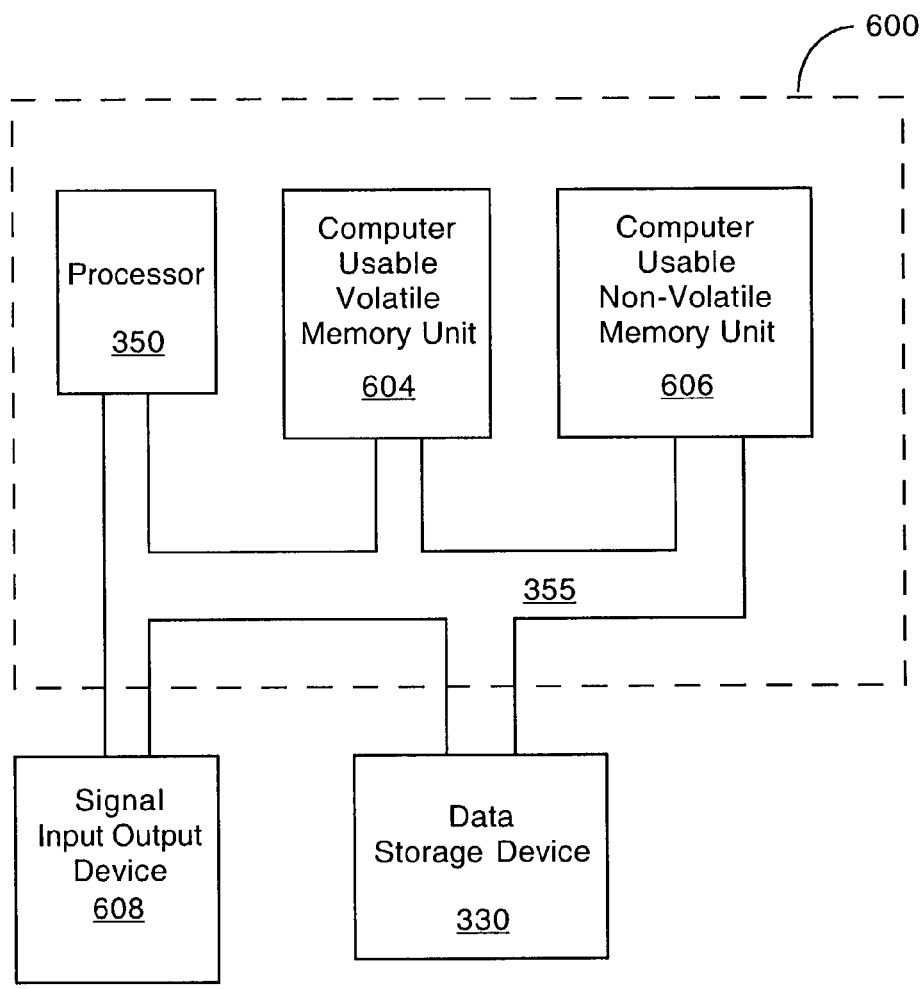
FIG. 6 is a block diagram of exemplary circuitry of a computing system that may be used as a platform to implement embodiments of the present invention.

FIG. 6 illustrates a block diagram of an exemplary computer system 600 used in accordance with embodiments of the present invention. System 600 of the present embodiment is well suited to be any type of computing device (e.g., server computer, portable computing device, desktop computer, etc.). Within the discussions of embodiments of the present invention, certain processes and steps are discussed that are realized, in one embodiment, as a series of instructions (e.g., software program) that reside within computer readable memory units of computer system 600 and executed by a processor(s) of system 600. When executed, the instructions cause computer 600 to perform specific actions and exhibit specific behavior that is described in detail herein.

Computer system 600 of FIG. 6 comprises an address/data bus 355 for communicating information, one or more central processors 350 coupled with bus 355 for processing information and instructions. Central processor unit(s) 350 may be a microprocessor or any other type of processor. The computer 600 also includes data storage features such as a computer usable volatile memory unit 604 (e.g., random access memory, static RAM, dynamic RAM, etc.) coupled with bus 355 for storing information and instructions for central processor(s) 350, a computer usable non-volatile memory unit 606 (e.g., read only memory, programmable ROM, flash memory, EPROM, EEPROM, etc.) coupled with bus 355 for storing static information and instructions for processor(s) 150. System 600 also includes one or more signal generating and receiving devices 608 coupled with bus 355 for enabling system 600 to interface with other electronic devices and computer systems. The communication interface(s) 608 of the present embodiment may include wired and/or wireless communication technology. For example, within the present embodiment, the communication interface 608 may be a serial communication port, a Universal Serial Bus (USB), an Ethernet adapter, a FireWire (IEEE 1394) interface, a parallel port, a small computer system interface (SCSI) bus interface, infrared (IR) communication port, Bluetooth wireless communication port, a broadband interface, or an interface to the Internet, among others.

The system 600 of FIG. 6 may also include one or more optional computer usable data storage devices 330 such as a magnetic or optical disk and disk drive (e.g., hard drive or floppy diskette) coupled with bus 355 for storing information and instructions.

Thus, the present invention provides, in various embodiments, a method and system for interactive invoice inquiry. The present invention further provides a method and system for interactive invoice inquiry which can be accessed by both a supplier and a requestor. Additionally, the present invention provides a method and system for interactive invoice inquiry which incorporates the interactions of both a requestor and a supplier into a single environment thereby enhancing dispute resolution and reducing supplier stress. The present invention further provides a method and system for interactive invoice inquiry which is compatible with existing network technology.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

What is claimed is:

1. A tangible computer-usable medium having instructions stored thereon that, in response to execution by at least one device, cause the at least one device to perform operations comprising:

receiving an invoice submitted by supplier, wherein said invoice is received in response to a purchasing request sent to said supplier;

storing said invoice in a network-accessible database, wherein said network-accessible database further comprises a plurality of invoices associated with a plurality of suppliers;

authorizing a customer access to said invoice submitted by said supplier and said plurality of invoices associated with said plurality of suppliers and wherein said customer sent said purchasing request to said supplier;

authorizing said supplier access to said invoice;

identifying the invoice in a table including information associated with the invoice responsive to a request for access to the invoice, wherein the information includes identity of the invoice, invoice data, indication of a hold placed on the invoice and an identity and contact information of a hold requester, wherein the requester is associated with authorization of the hold indication;

wherein the hold corresponds to an unresolved payment issue and prevents authorization for payment of the invoice;

displaying the table responsive to the request for access to the invoice from the supplier or the requester, or combinations thereof;

wherein the table is configured to be interactively modified by the requester or the supplier, or combinations thereof;

displaying table modifications;

utilizing the table modifications to resolve the hold for said invoice; and removing the hold responsive to resolution of the hold.

2. The tangible computer-usable medium of claim 1, wherein said operations further comprise selecting said unresolved payment issue from a group consisting of a purchase order inquiry, defective billing inquiry, invoice inquiry, and a payment inquiry.

3. The tangible computer-usable medium of claim 1, wherein said operations further comprise accessing said network-accessible database from a group of communications devices consisting of a computer, a telephone, a mobile phone, a pager, and a personal digital assistant (PDA).

4. The tangible computer-usable medium of claim 1, wherein said operations further comprise utilizing input from said requester to resolve said payment issue independent from a payment processing entity.

5. The tangible computer-usable medium of claim 1, wherein said operations further comprise utilizing input from said supplier to resolve said payment issue independent from a payment processing entity.

6. The tangible computer-usable medium of claim 1, wherein said operations further comprise authorizing a central purchasing group access to said plurality of invoices so as to allow said central purchasing group to audit said purchasing request associated with said invoice independently of any separate purchasing request associated with said supplier.

7. The tangible computer-usable medium of claim 1, wherein said operations further comprise authorizing said requester to access said plurality of invoices stored in said network-accessible database.

8. A system for interactive invoice inquiry comprising:

means for receiving an invoice associated with a supplier, wherein said invoice is received in response to a purchasing request sent to said supplier;

means for storing the invoice associated with said supplier and for storing a plurality of invoices associated with a plurality of other suppliers;

means for authorizing a requester access to the invoice associated with said supplier and said plurality of invoices;

means for authorizing access by said supplier to the invoice associated with said supplier without authorizing access by said supplier to said plurality of invoices submitted by said plurality of other suppliers;

means for identifying the invoice in a table including information associated with the invoice responsive to a request for access to the invoice, wherein the information includes identity of the invoice, invoice data, an indication of a hold placed on the invoice and an identity and contact information of a hold requester, wherein the requester is associated with authorization of the hold indication, wherein the hold corresponds to a payment issue and prevents authorization for payment of the invoice;

means for displaying the table responsive to the request for access to the invoice from the supplier or the requester, or combinations thereof, wherein the table is configured to be interactively modified by the requester or the supplier, or combinations thereof;

means for utilizing a table modification to resolve the hold for said invoice; and means for removing the hold responsive to resolution of the hold.

9. The system of claim 8, further comprising means for selecting said payment issue from a group consisting of a purchase order inquiry, defective billing inquiry, invoice inquiry, and a payment inquiry.

10. The system of claim 8, further comprising means for accessing said means for storing said invoice from a group of communications devices consisting of a computer, a telephone, a mobile phone, a pager, and a personal digital assistant (PDA).

11. The system of claim 8, wherein said requester has access to any of said plurality of invoices, including said invoice associated with said supplier.

12. The system of claim 8, wherein said supplier is not authorized to access said plurality of invoices associated with said plurality of other suppliers.

13. The system of claim 8, wherein said supplier only has access to said invoice associated with said supplier.

14. A method for execution by one or more processors for interactive invoice inquiry comprising:

receiving an invoice associated with a supplier, wherein said invoice is received in response to a purchasing request sent to said supplier;

storing said invoice in a network-accessible database, wherein said network-accessible database is further configured to store other invoices associated with other suppliers;

authorizing a requester access to said invoice associated with said supplier and said other invoices associated with said other suppliers, wherein said requester is a customer of said supplier and said other suppliers, and wherein said requester sent said purchasing request to said supplier;

restricting access by said supplier to said invoice associated with said supplier without authorizing said supplier access to said other invoices stored in said network-accessible database;

identifying the invoice in a hold table, using the one or more processors, wherein the hold table comprises identifying information associated with the invoice, wherein the information includes identity of the invoice, invoice data, a hold indication designated for the invoice and contact information of the requester, wherein the requester is associated with authorization of the hold indication;

wherein the hold indication corresponds to a payment issue and prevents authorization for payment of the invoice;

displaying the hold table in a display device responsive to a request for access to the invoice from the supplier or the requester, or combinations thereof;

wherein the hold table is configured to be interactively modified by the requester or the supplier, or combinations thereof;

displaying input in the display device interactively provided by said requester or said supplier, or combinations thereof;

and removing the hold responsive to the input to resolve the payment issue for said invoice.

15. The method of claim 14, further comprising:

resolving said payment issue for said invoice stored in said network-accessible database, said payment issue selected from a group consisting of a purchase order inquiry, defective billing inquiry, invoice inquiry, and a payment inquiry.

16. The method of claim 14, wherein said other invoices are received in response to a plurality of other purchasing requests sent to said other suppliers from said requester.

17. The method of claim 14, further comprising accessing said network-accessible database from a group of communications devices consisting of a computer, a telephone, a mobile phone, a pager, and a personal digital assistant (PDA).

18. The method of claim 14, further comprising:

identifying a first invoice of one or more invoices associated with said supplier;

identifying a second invoice of said invoices associated with said other suppliers; and displaying both of said first invoice and said second invoice.

19. The method of claim 14, further comprising authorizing said requester to access said network-accessible database to review said other invoices.

* * * * *